US012724257B2

(12) United States Patent
Zhang et al.

(10) Patent No.: US 12,724,257 B2
(45) Date of Patent: Sep. 1, 2026

(54) DIGITAL MICROSCOPE CAPABLE OF AUTOMATIC FOCUSING

(71) Applicant: Shenzhen Sky Blue Ocean Technology Co., Ltd, Shenzhen (CN)

(72) Inventors: Meixia Zhang, Longyan (CN); Junfa Wu, Shenzhen (CN); Biqiang Huang, Zhangshu (CN); Jianhui Fang, Shenzhen (CN)

(73) Assignee: Shenzhen Sky Blue Ocean Technology Co., Ltd, Shenzhen (CN)

( * ) Notice: Subject to any disclaimer, the term of this patent is extended or adjusted under 35 U.S.C. 154(b) by 165 days.

(21) Appl. No.: 18/806,612

(22) Filed: Aug. 15, 2024

(65) Prior Publication Data

US 2025/0138297 A1 May 1, 2025

(30) Foreign Application Priority Data

Oct. 31, 2023 (CN) ........................ 202322924688.X

(51) Int. Cl.
*G02B 21/24* (2006.01)

(52) U.S. Cl.
CPC .................................. *G02B 21/241* (2013.01)

(58) Field of Classification Search
CPC ........ G02B 21/241–245; G02B 21/247; G02B 21/36; G02B 21/362; G02B 21/365; G02B 21/02
See application file for complete search history.

(56) References Cited

U.S. PATENT DOCUMENTS

| | | | | |
|---|---|---|---|---|
| 2021/0373308 | A1* | 12/2021 | Liao | G02B 21/361 |
| 2022/0292854 | A1* | 9/2022 | Pang | G06V 10/26 |

* cited by examiner

*Primary Examiner* — Stephone B Allen
*Assistant Examiner* — Adam W Booher
(74) *Attorney, Agent, or Firm* — Birchwood IP

(57) ABSTRACT

The present disclosure relates to the technical field of digital microscopes, and particularly to a digital microscope capable of automatic focusing, including a housing and a lens assembly arranged at a bottom of the housing. A focusing mechanism is mounted at an interior of the housing; the focusing mechanism includes a support vertically mounted at the interior of the housing, a sliding block movably arranged on the support and parallel to the lens assembly, and an image sensor mounted on the sliding block; and the support is mounted with a driving assembly for controlling the movement of the sliding block to move the image sensor close to or away from the lens assembly. Through the above arrangements, human subjective factors are avoided; an automatic focusing effect is realized, which considers not only a focusing speed but also a focusing accuracy; and the convenience of use is improved.

5 Claims, 3 Drawing Sheets

DIGITAL MICROSCOPE CAPABLE OF AUTOMATIC FOCUSING

CROSS-REFERENCE TO RELATED APPLICATIONS

This application claims priority of Chinese Patent Application No. 202322924688.X, filed on Oct. 31, 2023, the entire contents of which are incorporated herein by reference.

TECHNICAL FIELD

The present disclosure relates to the technical field of digital microscopes, and particularly relates to a digital microscope capable of automatic focusing.

BACKGROUND

With the development of the times and technology, digital microscopes are rapidly popularized with the advantages of intuitive and convenient operations, and most users use the digital microscopes instead of traditional microscopes. A digital microscope is an instrument for observation and analysis by using an optical amplification principle and a digital imaging technology. It can magnify and microscopically image micro-samples, so that details and structures in a microscopic world can be observed more clearly.

Most of the existing digital microscopes are focused manually. Due to optical characteristics of a lens of the digital microscope, there are human subjective factors in manual focusing, resulting in slow focusing speed in near focusing and low focusing accuracy in far focusing. Therefore, it is necessary to design a digital microscope capable of automatic focusing to solve the above problems.

SUMMARY

To solve the above problems in the background, the present disclosure provides a digital microscope capable of automatic focusing, avoiding human subjective factors and realizing an automatic focusing effect which considers not only a focusing speed but also a focusing accuracy.

The present disclosure adopts the following solutions to solve the technical problems. A digital microscope capable of automatic focusing includes a housing and a lens assembly arranged at a bottom of the housing. A focusing mechanism is mounted at an interior of the housing; the focusing mechanism includes a support vertically mounted at the interior of the housing, a sliding block movably arranged on the support and parallel to the lens assembly, and an image sensor mounted on the sliding block; and the support is mounted with a driving assembly for controlling the movement of the sliding block to move the image sensor close to or away from the lens assembly.

By adopting the above solution, human subjective factors are avoided, and an automatic focusing effect is realized, which considers not only a focusing speed but also a focusing accuracy.

Further, the driving assembly includes a motor arranged at one end of the support and a screw rod connected to an output end of the motor; and an end of the screw rod connected to the motor passes through the sliding block and is threadedly connected to the sliding block.

By adopting the above solution, the motor drives the sliding block on the screw rod to slide circumferentially.

Further, a guide rail is connected between two ends of the support, and the sliding block is slidably mounted on the guide rail.

By adopting the above solution, the guide rail is arranged to convert the sliding block from circumferential movement to linear movement, thereby driving the image sensor to perform translation.

Further, the lens assembly includes a microscope lens, a circuit board sleeved on the microscope lens and an acquisition plate fixedly connected to the circuit board; and the circuit board is mounted with ranging modules for measuring an object's distance.

By adopting the above solution, the ranging modules are arranged to measure the object's distance in real-time, to assist digital signal processing (DSP) on the microscope to perform an automatic focusing operation.

Further, a positioning block is arranged on the image sensor, and a position sensor is mounted at a bottom of the acquisition plate, the position sensor being positioned via the positioning block.

By adopting the above solution, the position sensor is arranged to position the sliding block through the positioning block.

Further, fixing blocks for fixing the support at the interior of the housing are mounted at two ends of the support.

By adopting the above solution, the fixing block is arranged, so that the support and the housing can be firmly combined.

In summary, the present disclosure has the following beneficial effects. According to the digital microscope capable of automatic focusing, the human subjective factors are avoided; the automatic focusing effect is realized, which considers not only the focusing speed but also the focusing accuracy; and the flexibility of use is improved. The position sensor is arranged to position the sliding block; the ranging modules are arranged to measure the object's distance in real-time, to assist DSP on the microscope to perform an automatic focusing operation; the screw rod is arranged to move the sliding block in a highly accurate manner; the guide rail is arranged to convert the sliding block from circumferential movement to linear movement, thereby driving the image sensor to perform translation; and the fixing part is arranged, so that the support and the housing can be firmly combined.

The above description is merely the overview of the technical solutions of the present disclosure, which can be implemented according to the contents of the specification to enable the technical means of the present disclosure to be more clearly understood; and to make the above and other objects, features and advantages of the present disclosure more clearly understood, the preferred examples are described in detail below with reference to the accompanying drawings.

Figure 1:
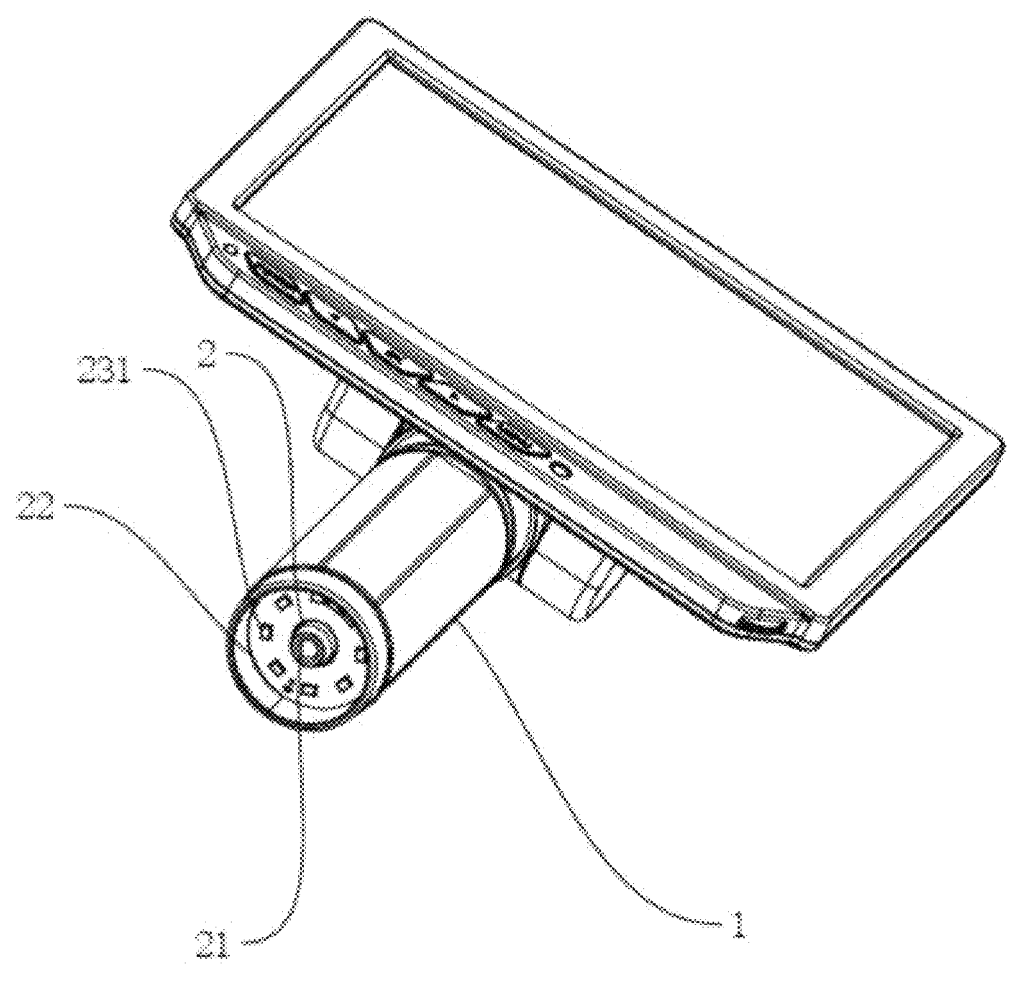
FIG. 1 is a schematic structural diagram of an example.

Reference numerals and denotations thereof: 1—housing; 2—lens assembly; 21—microscope lens; 22—circuit board; 23—acquisition plate; 231—ranging module; 3—support; 4—sliding block; 5—image sensor; 6—driving assembly; 61—motor; 62—screw rod; 7—position sensor; 8—guide rail; 9—fixing block; and 10—positioning block.

DETAILED DESCRIPTION

In order that the content of the present disclosure can be more clearly understood, the present disclosure will be further described below with reference to specific examples and the accompanying drawings.

It is to be noted the orientation or positional relationship indicated by the terms "center", "upper", "lower", "front", "rear", "left", "right", "inner", "outer" and the like used herein is based on that shown in the attached drawings, merely for the ease of describing the present disclosure and simplifying the description, rather than indicating or implying that the device or element referred to must be in a specific orientation, and constructed and operated in a specific orientation. Therefore, it is not to be understood as a limitation of the present disclosure. Unless otherwise indicated, "a plurality of" means two or more.

Unless otherwise specified and limited, the terms "mount", "link" and "connect" are to be understood in a broad sense, for example, "connect" may be fixedly connected, detachably connected, integrally connected, mechanically connected, electrically connected, directly connected or indirectly connected through an intermediate medium, or an internal communication between two elements. For those ordinarily skilled in the art, the specific meanings of the above terms in the present disclosure can be understood according to specific situations.

Figure 2:
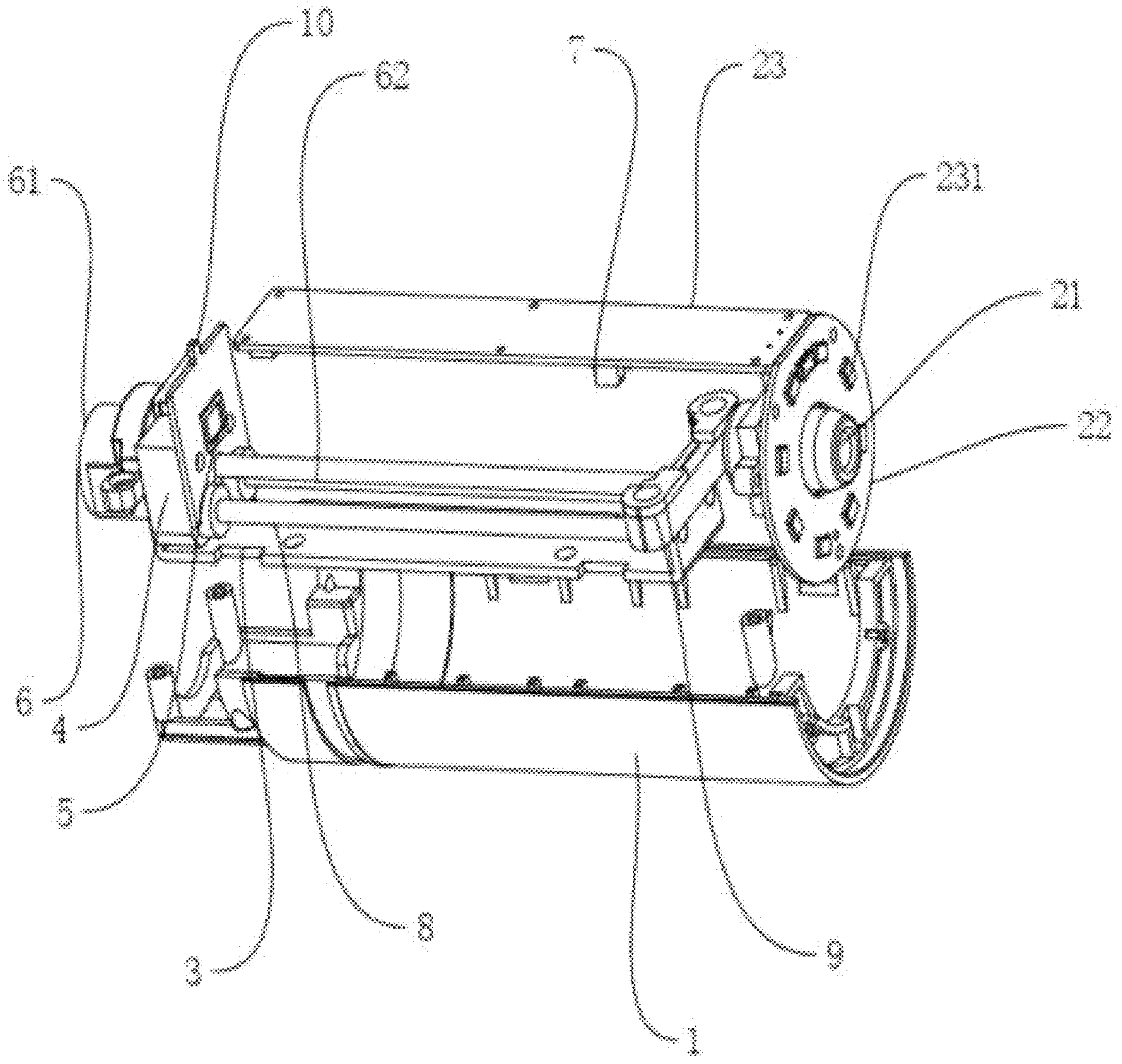
FIG. 2 is a cross-sectional view of the example.

As shown in FIGS. 1 and 2, a digital microscope capable of automatic focusing includes a housing 1 and a lens assembly 2 arranged at a bottom of the housing 1. A required image is captured through the lens assembly 2. A focusing mechanism is mounted at an interior of the housing 1; and the focusing mechanism includes a support 3 vertically mounted at the interior of the housing 1, a sliding block 4 movably arranged on the support 3 and parallel to the lens assembly 2, and an image sensor 5 mounted on the sliding block 4. The image sensor 5 is responsible for image acquisition, and can convert an optical signal into an electrical signal, and deliver the signal to a DSP processor in the microscope for processing. The support 3 is mounted with a driving assembly 6 for controlling the movement of the sliding block 4 to move the image sensor 5 close to or away from the lens assembly 2. When the DSP processor on the system automatically calculates a position of a clearest point, the DSP processor will control the driving assembly 6 to move the sliding block 4 to the position of the clearest point. According to the system, human subjective factors are avoided; an automatic focusing effect is realized, which considers not only a focusing speed but also a focusing accuracy; and the convenience of use is improved.

As shown in FIG. 2, the driving assembly 6 includes a motor 61 arranged at one end of the support 3 and a screw rod 62 connected to an output end of the motor 61; and an end of the screw rod 62 connected to the motor 61 passes through the sliding block 4 and is threadedly connected to the sliding block 4. It can be seen that when the motor 61 operates, the motor 61 drives the sliding block 4 on the screw rod 62 to slide circumferentially.

As shown in FIG. 2, a guide rail 8 is connected between two ends of the support 3, and the sliding block 4 is slidably mounted on the guide rail 8. The guide rail 8 is arranged to ensure that the sliding block 4 moves linearly; and when the motor 61 operates, the sliding block 4 on the guide rail 8 is converted from circumferential movement to linear movement, thereby driving the image sensor 5 to slide horizontally.

As shown in FIG. 2, the lens assembly 2 includes a microscope lens 21, a circuit board 22 sleeved on the microscope lens 21 and an acquisition plate 23 fixedly connected to the circuit board 22. Micro-samples can be enlarged to the extent that which can be seen by human eyes or detected by equipment by means of the microscope lens 21 to facilitate people's observation. The circuit board 22 is mounted with ranging modules 231 for measuring an object's distance, and several ranging modules 231 are arranged to effectively improve the accuracy of measuring the object's distance.

As shown in FIG. 2, a positioning block 10 is arranged on the image sensor 5, and a position sensor 7 is mounted at a bottom of the acquisition plate 23, the position sensor 7 being configured to position the sliding block 4, and the position sensor 7 being positioned via the positioning block 10. The DSP processor controls the movement of the motor 61, the position sensor 7 is positioned via the positioning block 10, and the object's distance is measured by means of ranging modules 231. The ranging module 231 assists the DSP processor in the microscope to perform an automatic focusing operation at the same time, and automatically calculates the position of the clearest point. The DSP processor controls the motor 61 to drive the image sensor 5 on the sliding block 4 to slide along the screw rod 62 to position of the clear point, to improve the focusing accuracy, thereby realizing the automatic accurate focusing effect, avoiding the human subjective factors, making the focusing clearer, and improving the convenience of use.

As shown in FIG. 2, fixing blocks 9 for fixing the support 3 at the interior of the housing 1 are mounted at two ends of the support 3. The support 3 can be well fixed together with the housing 1 by means of the fixing blocks 9, to avoid the movement of the support 3 in the housing, thereby affecting the calculation of data of the position of the clearest point.

Figure 3:
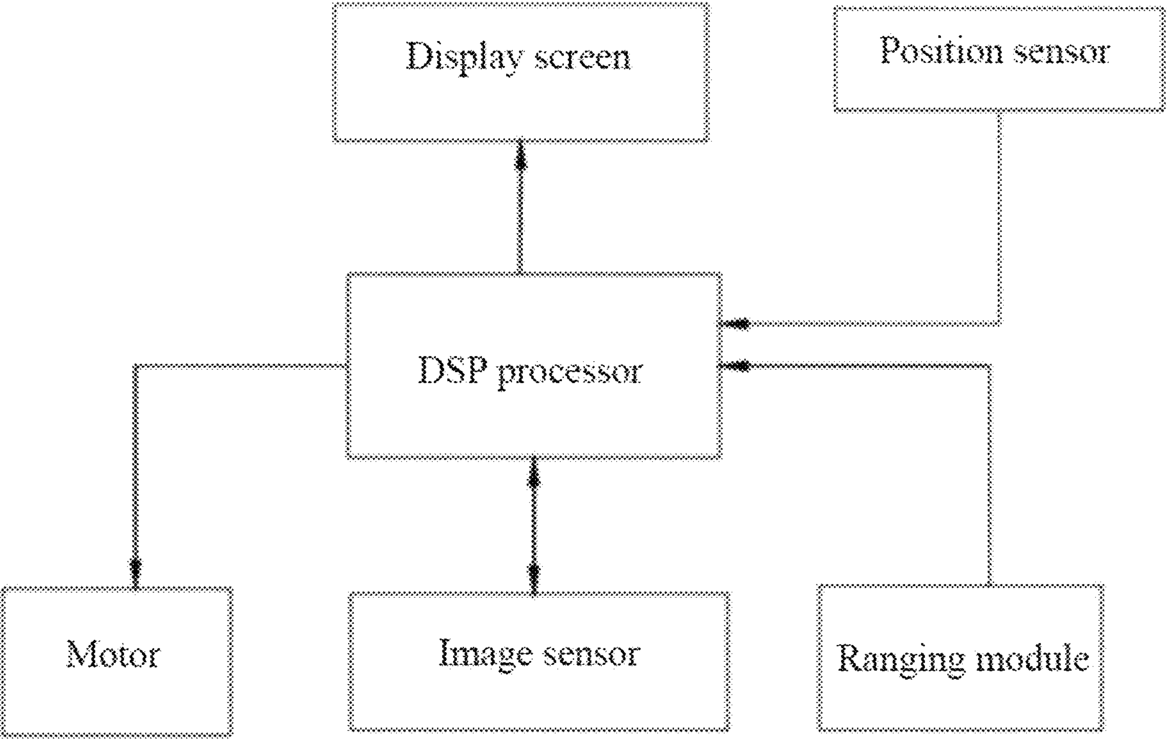
FIG. 3 is a schematic diagram of the example.

As shown in FIG. 3, the working principle of the example is as follows. The image sensor 5 is responsible for image acquisition, converting an optical signal into an electrical signal, and then sending the signal to the DSP processor for processing. The ranging modules 231 are controlled by the DSP processor, and are responsible for measuring a distance between the microscope lens 21 and an observed object in real-time. The display screen is controlled by the DSP processor; and the position sensor 7 is controlled by the DSP processor, and is responsible for positioning the image sensor 5. When the system operates, the DSP processor acquires the data of the image sensor 5 and the ranging modules 231, and automatically calculates the position of the clearest point. The data of the position can be displayed on the display screen, the position sensor 7 positions the image sensor 5, and the DSP processor controls the motor 61 to move the image sensor 5 to the position of the clearest point, to realize the automatic focusing effect.

In summary, the example has the following beneficial effects. According to the digital microscope capable of automatic focusing in the example, the human subjective factors are avoided; the automatic focusing effect is realized, which considers not only the focusing speed but also the focusing accuracy; and the flexibility of use is improved. The position sensor 7 is arranged to position the sliding block 4; the ranging modules 231 are arranged to measure the object's distance in real-time, to assist DSP on the microscope to perform an automatic focusing operation; the screw rod 62 is arranged to move the sliding block in a highly accurate manner; the guide rail 8 is arranged to convert the sliding block from circumferential movement to linear movement, thereby driving the image sensor 5 to perform translation; and the fixing part is arranged, so that the support 3 and the housing 1 can be firmly combined.

The above examples are merely preferred implementations of the present disclosure, which cannot be used to define the scope of protection of the present disclosure, and any insubstantial changes and modifications made by those skilled in the art on the basis of the present disclosure fall within the scope of protection of the present disclosure.

The invention claimed is:

1. A digital microscope capable of automatic focusing, comprising: a housing and a lens assembly arranged at a bottom of the housing, wherein a focusing mechanism is mounted at an interior of the housing; the focusing mechanism comprises a support vertically mounted at the interior of the housing, a sliding block movably arranged on the support and parallel to the lens assembly, and an image sensor mounted on the sliding block; and the support is mounted with a driving assembly for controlling a movement of the sliding block to move the image sensor close to or away from the lens assembly;

wherein the lens assembly comprises a microscope lens, a circuit board sleeved on the microscope lens and an acquisition plate fixedly connected to the circuit board; and the circuit board is mounted with ranging modules for measuring an object's distance.

2. The digital microscope capable of automatic focusing according to claim 1, wherein the driving assembly comprises a motor arranged at one end of the support and a screw rod connected to an output end of the motor; and an end of the screw rod connected to the motor passes through the sliding block and is threadedly connected to the sliding block.

3. The digital microscope capable of automatic focusing according to claim 1, wherein a guide rail is connected between two ends of the support, and the sliding block is slidably mounted on the guide rail.

4. The digital microscope capable of automatic focusing according to claim 1, wherein a positioning block is arranged on the image sensor, and a position sensor is mounted at a bottom of the acquisition plate, the position sensor being positioned via the positioning block.

5. The digital microscope capable of automatic focusing according to claim 1, wherein fixing blocks for fixing the support at the interior of the housing are mounted at two ends of the support.

* * * * *